United States Patent
Chabert et al.

(10) Patent No.: US 9,010,423 B2
(45) Date of Patent: Apr. 21, 2015

(54) METHOD FOR THE ASSISTED RECOVERY OF HYDROCARBONS IN FRACTURED RESERVOIRS

(75) Inventors: Max Chabert, Bordeaux (FR); Mikel Morvan, Pessac (FR)

(73) Assignee: Rhodia Operations, Aubervilliers (FR)

(*) Notice: Subject to any disclaimer, the term of this patent is extended or adjusted under 35 U.S.C. 154(b) by 421 days.

(21) Appl. No.: 13/497,590

(22) PCT Filed: Jul. 26, 2010

(86) PCT No.: PCT/EP2010/060791
§ 371 (c)(1), (2), (4) Date: Jul. 16, 2012

(87) PCT Pub. No.: WO2011/035948
PCT Pub. Date: Mar. 31, 2011

(65) Prior Publication Data
US 2013/0037265 A1  Feb. 14, 2013

(30) Foreign Application Priority Data
Sep. 23, 2009  (FR) .................................. 09 04535

(51) Int. Cl.
E21B 43/20 (2006.01)
C09K 8/584 (2006.01)

(52) U.S. Cl.
CPC ...................................... *C09K 8/584* (2013.01)

(58) Field of Classification Search
None
See application file for complete search history.

(56) References Cited

U.S. PATENT DOCUMENTS

| 4,842,065 A | 6/1989 | McClure |
| 5,014,783 A | 5/1991 | McClure |
| 5,042,580 A * | 8/1991 | Cullick et al. ............. 166/252.1 |
| 5,247,993 A | 9/1993 | Sarem et al. |
| 6,831,108 B2 | 12/2004 | Dahanayake et al. |
| 7,461,694 B2 | 12/2008 | Dahanayake et al. |
| 7,581,594 B2 * | 9/2009 | Tang .......................... 166/308.2 |
| 8,061,422 B2 * | 11/2011 | Mohanty et al. .............. 166/266 |
| 8,763,710 B2 * | 7/2014 | Graue .......................... 166/402 |
| 2007/0107897 A1 | 5/2007 | Dahanayake et al. |
| 2010/0096129 A1 * | 4/2010 | Hinkel et al. ............... 166/270.1 |
| 2012/0186810 A1 * | 7/2012 | Dahanayake et al. ......... 166/263 |

* cited by examiner

*Primary Examiner* — Angela M DiTrani
*Assistant Examiner* — Anuradha Ahuja
(74) *Attorney, Agent, or Firm* — Xuping Fu

(57) ABSTRACT

A method for recovering oil from a fractured reservoir having an oil-wettable matrix and comprising at least one injection well and one production well. This method comprises the following steps in such order: a) injecting by an injection well a solution of viscosity-enhancing surfactants, capable of penetrating into the array of fractures, having limited interaction with the matrix, and creating a plug in situ to reduce the perviousness of the fractures and to promote the passage of the solution of step b) into the matrix; b) injecting by an injection well a solution of surfactants, capable of interacting with the matrix to make water-wettable and to extract the oil therefrom; c) injecting by an injection well an aqueous solution to increasing the surface tension, impregnating the matrix and, after the plug in step a) is dissolved by the oil, driving the oil toward the production well.

19 Claims, 2 Drawing Sheets

METHOD FOR THE ASSISTED RECOVERY OF HYDROCARBONS IN FRACTURED RESERVOIRS

CROSS-REFERENCE TO RELATED APPLICATIONS

This application is the U.S. National Phase of International Application No. PCT/FR2010/060791 filed on Jul. 26, 2010, which claims priority to French Application No. FR 09 04535, filed Sep. 23, 2009.

FIELD OF THE INVENTION

The invention relates to a method for the assisted recovery of hydrocarbons in fractured reservoirs.

BACKGROUND

Within the context of the production of crude petroleum, or oil, from subterranean formations, there are already various methods in existence for optimizing the extraction of original oil in place (OOIP).

The primary method of crude oil production consists, once the well has been drilled, of recovering the crude oil by migration of the oil from the rock or sand formation to a lower pressure "producer" well. Consequently the primary production is the least expensive method of extraction. Typically only 10 to 15% of OOIP are recovered. Nevertheless, as the petroleum is pumped, the pressure of the reservoir decreases and the extraction becomes more difficult.

Secondary methods of production are employed when the subterranean pressure becomes insufficient to displace the remaining petroleum. The most common technique, water-flooding, uses injection wells which force a driving fluid consisting of large volumes of water under pressure into the zone containing the petroleum. During its migration from the zone towards one or more producer wells, the injected water extracts part of the petroleum which it encounters. On the surface, the petroleum is separated from the injected water. Water-flooding makes it possible to recover an additional 10 to 30% of OOIP.

When the water-flooding reaches the point where the production is no longer profitable, a decision should be taken: to change the oil field, or to use another phase of exploitation. It is then possible to use a technique of assisted recovery using water-flooding in which the water comprises surfactants and/or polymers. These polymers are used in order to increase the viscosity of the driving fluid and thus to improve the scavenging of the petroleum by the driving fluid. It is known for example to increase the viscosity of the water by means of viscosifiers such as partially hydrolyzed polyacrylamides of high molecular weight. These polymers, dispersible and/or soluble in water, enable more homogeneous scavenging of the formation while reducing the appearance of viscous fingering.

Zwitterionic surfactants and in particular betaines can be used as viscosifiers because of their stability in brines of which the temperature can reach 80° C. and more. The term zwitterionic describes surfactants having a permanent positive charge independently of the pH and having a negative charge above a certain pH.

In another approach, upon contact with the petroleum contained in the rock or the sand the surfactants lower the water/oil interfacial tension in order to make it possible to entrain the oil trapped in the constrictions of the pores of the reservoir.

However, numerous hydrocarbon reservoirs are not homogeneous with regard to geology and exhibit a great variety of porosity and of permeability. This is the case in particular for carbonate reservoirs which are often naturally and abundantly fractured. These fractured reservoirs include two separate elements: fractures and a matrix consisting of the rock containing petroleum. If the network of fractures permits an easy transfer of fluids from the reservoir, it only represents a small fraction of the total porosity of the reservoir. The matrix which has a low permeability contains the majority of the porosity of the reservoir and therefore of the oil. The water invasion techniques mentioned above ("water-flooding") and applied to these reservoir rapidly lead to an excessive increase in the water/oil ratio at the producer well. After having entrained the petroleum located in the fractures, the water continues to be displaced preferentially through the network of fractures and, in so doing, does not entrain the petroleum of the matrix. This results from the fact that the matrix is most often preferentially wettable with the oil as is often the case with carbonate reservoirs. Therefore water cannot spontaneously soak the matrix in order to displace the oil which is trapped there and causes the fractures, the pressure loss between the injector well and the producer well, both in communication with the fractures and the matrix, is too low to force this soaking.

A known method known for increasing the penetration of water into the matrix consists of injecting an aqueous solution of specific surfactant with the purpose of creating favorable conditions for wetting with water. In order to take advantage of this method, it is recommended to proceed with cyclic injection of fluids, a method described under the term "cyclic wettability alteration" as illustrated in the patents U.S. Pat. Nos. 4,842,065, 5,014,783 and 5,247,993. The principle consists in the first place of injecting a solution of surfactants capable of altering the wettability of the matrix, in order next to observe a latency before injecting water. By repeating these steps in this way part of the oil in the matrix is displaced. However, the water/oil ratios remain insufficient and these processes necessitate repeated injections in quick succession of surfactant and water.

Therefore there is a need to improve these processes in order to achieve more favorable oil/water ratios.

SUMMARY OF THE INVENTION

The present invention relates to a combination of chemical treatments intended precisely to obtain more favorable oil/water ratios at the producer well and to improve the extraction of oil in the matrix of a reservoir which is fractured and wettable with oil.

The present invention relates in fact to a method for the recovery of petroleum of a fractured reservoir of which the matrix is wettable with oil including at least one injector well and one producer well, both in communication with the fractures and the matrix including, in order, the following steps:

a) injection in a first time by an injector well of a solution of viscosifying surfactants capable of penetrating into the network of fractures, interacting slightly with the matrix, creating a plug in situ with a view to substantially and selectively reducing the permeability of the fractures and favoring the passage of the solution of from step b) into the matrix;

b) injection in a second time by an injector well of a solution of surfactants capable of interacting with the matrix in order to render it preferably wettable with water and to extract oil therefrom, the said solution preferably flowing through the matrix, and, after a latency of at least 24 hours, c) injection in a third time by an injector well of an aqueous solution for the purpose of increasing the surface tension, soaking the matrix, extracting the oil, and after dissolution by the said oil of the plug formed in step a), entraining the oil towards the producer well.

DETAILED DESCRIPTION OF PREFERRED EMBODIMENTS

The injection of step a) is preferably carried out at an injection pressure which does not lead to additional fracturing of the reservoir.

The latency between the second step b) and the third step c), which is at least 24 hours, is preferably less than 6 months, even more preferably 3 months and most preferably one month, the time to enable the solution of surfactants from step b) to make the matrix wettable with water and to extract the maximum amount of oil therefrom and thus to enable the oil to start to dissolve the plug formed in step a).

The plug formed in step a) is in the form of a very viscous liquid or a gel and therefore makes it possible to substantially and selectively reduce the permeability of the fractures and to favor the passage of the solution from step b) into the matrix.

The procedure, that is to say the implementation of steps a), b) and c), can be repeated as many times as necessary until the well is exhausted.

The solution of viscosifying surfactant preferably includes at least one zwitterionic surfactant which complies with the following formula (1):

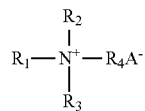

formula (1)

in which:

$A^-$ represents the $COO^-$ carboxylate groups or $SO_3^-$ sulfonate groups, $R_1$ represents a hydrophobic part of an alkyl, alkoxy, alkylaminoalkyl and alkylamidoalkyl group, linear or branched, saturated or preferably unsaturated, containing approximately from 16 to 30, preferably from 18 to 28 carbon atoms, $R_2$ and $R_3$ represent independently an aliphatic chain having from 1 to 30 carbon atoms, preferably from 1 to 20 carbon atoms, more preferably from 1 to 10 carbon atoms, and even more preferably from 1 to 6 carbon atoms, wherein the said aliphatic group may be straight or branched, saturated or unsaturated, the preferred groups $R_2$ and $R_3$ being methyl and hydroxymethyl, ethyl and 2-hydroxyethyl, propyl and 3-hydroxypropyl groups, and $R_4$ is an alkylene group having from 1 to 4 carbon atoms, optionally substituted by a hydroxyl group.

Specific examples of zwitterionic viscosifying surfactants include the following structures:

In formula (1), $R_1$ may be an alkylamidopropyl, $R_2$ and $R_3$ represent a 2-hydroxyethyl, methyl or ethyl group, $R_4$ is a methylene group and A is a carboxylate group, and the structures may then comply with the formula (2):

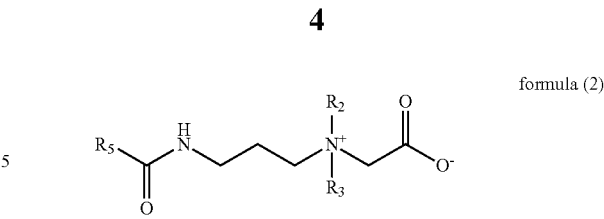

formula (2)

in which:

$R_1$ of formula (1) is the alkylamidopropyl group of formula: $R_5CONHCH_2CH_2CH_2$ in formula (2) and the group $R_5$—C=O is a $C_{12}$-$C_{24}$ alkanoyl group. This $C_{12}$-$C_{24}$ alkanoyl group is chosen in particular from among the dodecanoyl, tetradecanoyl (myristoyl), hexadecenoyl (cetoyl), octadecenoyl (oleoyl), octadecanoyl (stearoyl) and docosenoyl (erucoyl) groups.

According to another variant, in formula (1) $R_1$ is an alkylamidopropyl and the group $R_5$—C=O is a $C_{12}$-$C_{24}$ alkanoyl group chosen in particular from among the dodecanoyl, tetradecanoyl (myristoyl), hexadecenoyl (cetoyl), octadecenoyl (oleoyl), octadecanoyl (stearoyl) and docosenoyl (erucoyl) groups.

$R_2$ and $R_3$ represent a 2-hydroxyethyl, methyl or ethyl group, $R_4$ is an optionally hydroxylated propylidene group and A is a sulfonate group, and they may then for example comply with the formula (3):

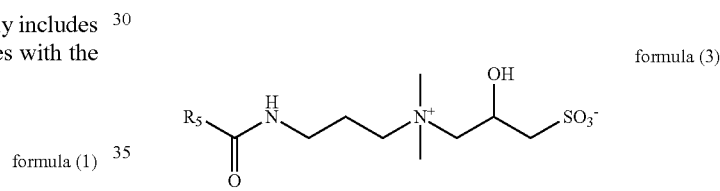

formula (3)

in which $R_2$ and $R_3$ of the formula (1) represent a methyl in formula (3), $R_4$ of the formula (1) represents a hydroxypropylidene group in formula (3) and A of formula (1) represents a sulfonate group in formula (3).

According to another variant, in formula (1) $R_1$ is a $C_{12}$-$C_{24}$ alkyl group preferably chosen from among the dodecyl (lauryl), tetradecyl (myristyl), hexadecyl (cetyl), octadecenyl (oleyl), octadecyl (stearyl), docosenoic (erucyl) groups, $R_2$ and $R_3$ represent a 2-hydroxyethyl, methyl or ethyl group, $R_4$ is a methylene group and A is a carboxylate group, and the viscosifying surfactants may then comply with the formula (4):

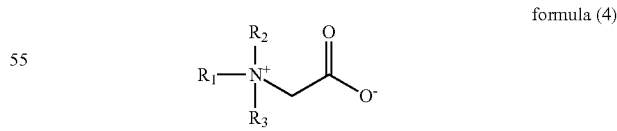

formula (4)

According to another variant, in formula (1) $R_1$ is a $C_{12}$-$C_{24}$ alkyl group preferably chosen from among the dodecyl (lauryl), tetradecyl (myristyl), hexadecyl (cetyl), octadecenyl (oleyl), octadecyl (stearyl), docosenoic (erucyl) groups, $R_2$ and $R_3$ represent a 2-hydroxyethyl, methyl or ethyl group, $R_4$ represents an optionally hydroxylated propylidene group and A is a sulfonate group, and the viscosifying surfactants may then for example comply with the formula (5):

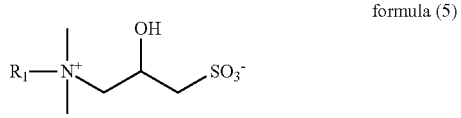

formula (5)

in which $R_2$ and $R_3$ of the formula (1) represent a methyl in formula (5), $R_4$ of the formula (1) represents a hydroxypropylidene group in formula (5) and A of formula (1) represents a sulfonate group in formula (5).

Examples of recommended surfactants for the implementation of the invention are more particularly described in the patents U.S. Pat. Nos. 7,461,694 and 6,831,108.

The concentration of viscosifying surfactants is chosen in order preferably to have a viscosity with a speed gradient of 10 $s^{-1}$ equivalent to at least 5 times and more preferably at least 10 times the viscosity of the injection water at the temperature of the reservoir. These conditions which lead to a preferential invasion of the network of fractures by the viscosifying surfactants ultimately make it possible to force the penetration of the wetting agent into the matrix and therefore to modify the wettability of this matrix more effectively. A second advantage of the present invention results from the fact that when the oil produced from the matrix during step b) interacts with the viscosifying agent towards the end of step b) and at the start of step c), the viscosity of this latter drops in order to allow the passage of the oil through the network of fractures and its extraction at the producer well.

Any surfactant capable of interacting with the matrix in order to render it preferentially wettable with water can be used in step b) of the method according to the invention in so far as it satisfies the criterion of changing the wettability of the matrix. A wetting agent is understood to be any surfactant which in the presence of oil makes it possible to reduce the contact angle of the aqueous solution on the surface of the rock of the well in question with respect to the contact angle of the injection water with no additives. The wetting agents are preferably chosen from among the anionic, nonionic or amphoteric surfactants. By way of non-limiting examples of nonionic wetting agents mention may be made of alkylarylpolyether polyalcohols, such as ethoxylated alkylphenols, ethoxylated or ethoxylated/propoxylated fatty alcohols, glycerol esters, alkanolamides, ethoxylated or epoxy propoxylated fatty amines, ethoxylated or ethoxylated/propoxylated tristyrylphenols, ethoxylated mercaptans, EO-PO block copolymers. By way of non-limiting examples of anionic wetting agents mention may be made of alkylether sulfates, alkylsulfonates, alkylaryl sulfonates, alkyl and/or alkylether and/or alkylarylether ester phosphates. By way of non-limiting examples of amphoteric surfactants mention may be made of the imidazoline and alkylpolyamine derivatives.

The aqueous solution of step c) may be either fresh water optionally with the addition of mineral salts supplying ions such as sulfate, calcium, sodium and carbonate ions, or sea water.

One of the advantages of the method according to the invention is that all of the 3 steps of the treatment cycle can be effected from the same injector well or also from different injector wells. In particular it is possible to envisage injecting the viscosifying treatment and the wetting agent in one and the same injector well in order then to effect scavenging with water in another adjacent injector well.

The following examples illustrate the invention without limiting the scope thereof Reference will be made to the appended drawings in which:

EXAMPLE 1

Plugging of a Porous Medium with High Permeability by a Viscosifying Surfactant

A solution of erucylamidopropyl betaine at 3000 ppm in synthetic sea water (9.75 g/l $Na^+$, 1.41 g/l $Mg^{2+}$, 20.31 g/l $Cl^-$, 0.42 g/l $K^+$, 0.44 g/l $Ca^{2+}$)—viscosity 20 mPa·s at 100 $s^{-1}$—is injected at ambient temperature and at a constant pressure of 30 mbars in a regular porous medium micromodel with a permeability of 10 darcy (volume of pores 10 µL).

The volume of solution flowing is weighed over time. After half an hour of circulation in the micromodel (for instance approximately a porous volume of injected liquid) the throughput becomes almost nil. The erucylamidopropyl betaine has a plug effect in a porous medium with substantial permeability (characteristic dimensions 50 microns). The mean shear rate in this example is approximately 100 $s^{-1}$.

Figure 1:
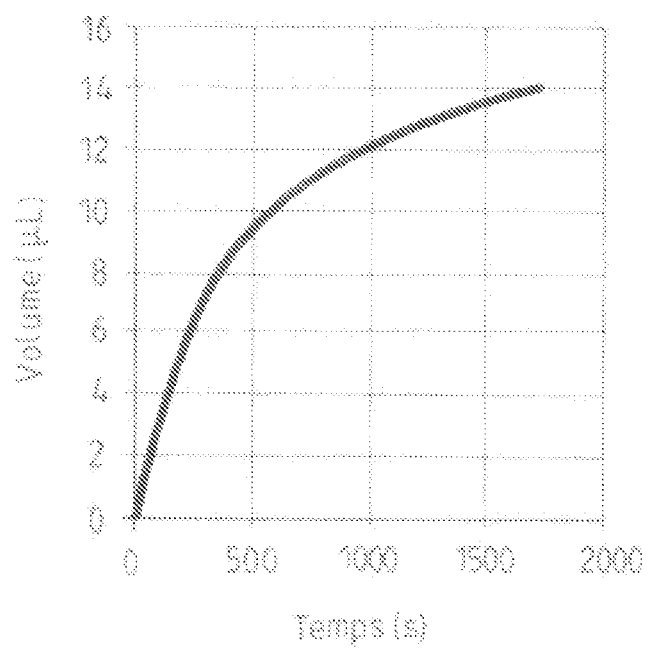
FIG. 1 shows the volume of solution flowing over time at a constant pressure of 30 mbars through a porous medium micromodel.

FIG. 1 of the appended drawings shows the volume of solution flowing over time at a constant pressure of 30 mbars.

EXAMPLE 2

Diversion of an Optionally Wetting Surfactant Agent from the Fracture Towards the Porous Matrix A porous medium micromodel having a double pore size distribution (respectively 4 darcy—matrix and 100 darcy—fracture) is used. This micromodel is initially filled with oil (dodecane). The fracture contains 20% of the porosity of the micromodel, the matrix contains the remaining 80%.

In a first injection mode, a surfactant (dodecylbenzene-sulfonate) is injected directly at a capillary number of approximately $10^{-6}$ in the medium with double porosity. As FIG. 2 shows, only the fractures (channels 1 with high permeability) are invaded in a time of one hour, for instance a recovery of oil of 20% OOIP.

In a second injection mode, a solution of erucylamidopropyl betaine at 3000 ppm in synthetic sea water (composition and viscosity as in Example 1) is injected at a capillary number Ca of $10^{-5}$. Only the fractures are invaded (20% OOIP). In a second time the surfactant solution (dodecylbenzene-sulfonate) is injected at a capillary number Ca of $10^{-6}$. It can be seen in FIG. 3 that this time the surfactant has invaded the fractures 1 and the matrix (channels 4 of lower permeability). The quantity of additional oil recovered is estimated at approximately 40% of the OOIP.

This shows the usefulness of our method for favoring the penetration of a surfactant agent from a fracture towards a matrix wetted with oil.

Figure 2:
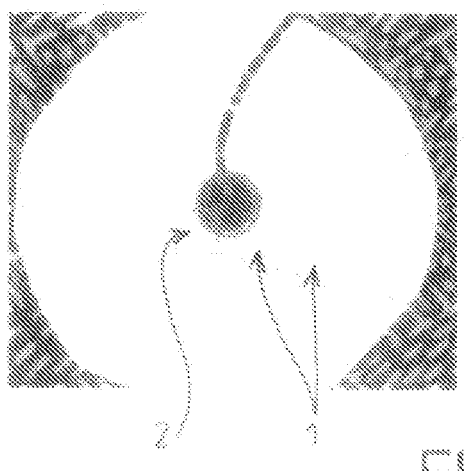
FIG. 2 shows a porous medium micromodel with double porosity where only the pores with high porosity 1 are invaded by a surfactant solution, of which a portion 2 has been enlarged approximately 7 times.
Figure 2:
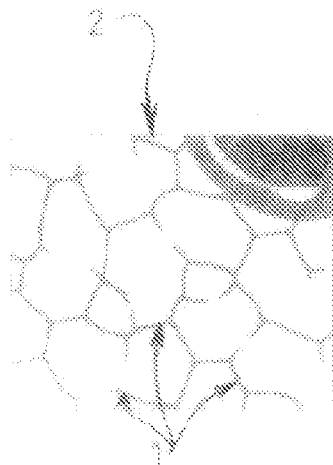
Figure 3:
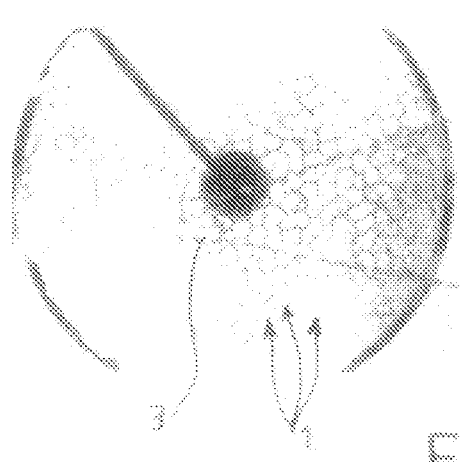
FIG. 3 shows a porous medium micromodel with double porosity, of which a portion 3 has been enlarged approximately 7 times where the pores with high porosity 1 have been pre-filled with the optionally wetting solution of viscosifying surfactant, the pores of low porosity 4 are filled with the optionally wetting solution of surfactant.
Figure 3:

FIG. 2 of the appended drawings shows a photograph of the micromodel with double porosity. After circulation of a surfactant at Ca=10⁻⁶, only the fractures 1 are invaded (20% OOIP). FIG. 3 of the appended drawings shows a photograph of the micromodel with double porosity: when the fractures 1 have been pre-filled with a viscosifying surfactant, the surfactant circulating at Ca=10⁻⁶ penetrates into the matrix from the fracture (additional 40% OOIP).

The invention claimed is:

1. A method for recovery of petroleum oil from a fractured reservoir wherein the fractured reservoir comprises:
   a matrix that is wettable with oil
   a network of fractures,
   at least one injector well in communication with the network of fractures and the matrix,
   a producer well in communication with the network of fractures and the matrix, said method comprising the following steps in order:
   a) injecting at a first time through the at least one injector well a first solution of viscosifying surfactants adapted to penetrate into the network of fractures and form a plug in situ,
   wherein the plug is adapted to substantially and selectively reduce a permeability of the network of fractures and increase the flow of a second solution into the matrix;
   b) injecting at a second time through the at least one an injector well the second solution of surfactants adapted to interact with the matrix, increase the wettability of the matrix with water, and extract oil therefrom,
   wherein the second solution flows through the matrix; and
   c) after a latency period of at least 24 hours, injecting through the at least one injector well an aqueous third solution adapted to increase a surface tension, wherein the third solutions permeates and extracts the oil from the matrix,
   the oil dissolves the plug, and
   the third solution entrains the oil to the producer well.

2. The method of claim 1, further comprising injecting the first solution at an injection pressure that does not increase fracturing of the reservoir.

3. The method of claim 2, wherein the first solution comprises at least one zwitterionic surfactant of formula:

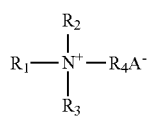

wherein:
A⁻ comprises a carboxylate or sulfonate group,
$R_1$ comprises a hydrophobic part of an alkyl, alkoxy, alkylaminoalkyl or alkylamidoalkyl group that is linear or branched, saturated or unsaturated, and comprises from 16 to 30 carbon atoms,
$R_2$ and $R_3$ independently comprise an aliphatic chain having from 1 to 30 carbon atoms,
wherein said aliphatic chain is straight or branched, saturated or unsaturated, and
$R_4$ comprises an alkylene group having from 1 to 4 carbon atoms, optionally substituted with a hydroxyl group.

4. The method of claim 3, wherein $R_2$ and $R_3$ independently comprise a methyl hydroxymethyl, ethyl, 2-hydroxyethyl, propyl, or 3-hydroxypropyl group.

5. The method of claim 3, wherein:
$R_1$ comprises an alkylamidopropyl group,
$R_2$ and $R_3$ independently comprise a 2-hydroxyethyl, methyl, or ethyl group,
$R_4$ comprises a methylene group, and
A comprises a carboxylate group.

6. The method of claim 5, wherein the first solution comprises a viscosifying surfactant of formula:

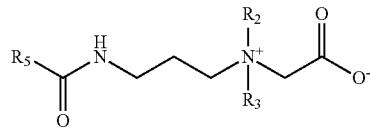

wherein $R_5$ comprises a $C_{12}$-$C_{24}$ alkyl group.

7. The method of claim 3, wherein:
$R_1$ comprises an alkylamidopropyl group comprising a $C_{12}$-$C_{24}$ alkyl group;
$R_2$ and $R_3$ independently comprise a 2-hydroxyethyl, methyl or ethyl group;
$R_4$ comprising an optionally hydroxylated propylidene group; and
A comprises a sulfonate group.

8. The method of claim 7, wherein the first solution comprises a zwitterionic surfactant of formula:

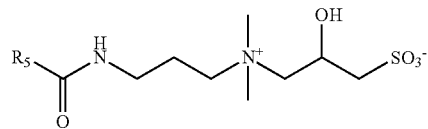

wherein $R_5$ comprises a $C_{12}$-$C_{24}$ alkyl group.

9. The method of claim 8, wherein $R_5$—C=O comprises a dodecanoyl, tetradecanoyl (myristoyl), hexadecenoyl (cetoyl), octadecenoyl (oleoyl), octadecanoyl (stearoyl) or docosenoyl (erucoyl) group.

10. The method of claim 3, wherein
$R_1$ comprises a $C_{12}$-$C_{24}$ alkyl group,
$R_2$ and $R_3$ independently comprise a 2-hydroxyethyl, methyl or ethyl group,
$R_4$ comprises a methylene group, and
A comprises a carboxylate group.

11. The method of claim 10, wherein $R_1$ comprises a dodecyl (lauryl), tetradecyl (myristyl), hexadecyl (cetyl), octadecenyl (oleyl), octadecyl (stearyl), or docosenoic (erucyl) group.

12. The method of claim 3, wherein:
$R_2$ and $R_3$ independently comprise a methyl group,
$R_4$ comprises an optionally hydroxylated propylidene group, and
A comprises a sulfonate group.

13. The method of claim 1, wherein the latency period is less than 6 months.

14. The method of claim 1, wherein the first solution has a viscosity at a speed gradient of $10 \text{ s}^{-1}$ of at least 5 times a viscosity of an injection water at a temperature of the reservoir.

15. The method of claim 14, wherein the first solution has a viscosity of at least 10 times the viscosity of the injection water at the temperature of the reservoir.

16. The method of claim 1, wherein the second solution comprises an anionic surfactant, a nonionic surfactant, an amphoteric surfactant, or combination thereof.

17. The method of claim 16, wherein the second solution comprises an alkylarylpolyether polyalcohol, an ethoxylated or ethoxylated/propoxylated fatty alcohol, a glycerol ester, an alkanolamide, an ethoxylated or epoxy propoxylated fatty amine, an ethoxylated or ethoxylated/propoxylated tristyrylphenol, an ethoxylated mercaptan, an EO-PO block copolymer, an alkylether sulfate, an alkylsulfonate, an alkylaryl sulfonate, an alkyl and/or alkylether and/or alkylarylether ester phosphate, an imidazoline derivative, an alkylpolyamine, or a combination thereof.

18. The method of claim 15, wherein the steps a), b), and c) are repeated until the well is exhausted of oil.

19. The method claim 15, wherein the third solution comprises:
fresh water, optionally with an added mineral salt,
sea water, or
a combination thereof.

* * * * *